United States Patent [19]

Black

[11] 3,888,122

[45] June 10, 1975

[54] METHOD AND APPARATUS FOR OBTAINING THE FINE SCALE STRUCTURE OF THE EARTH'S GRAVITY FIELD

[75] Inventor: Harold D. Black, Highland, Md.

[73] Assignee: The United States of America as represented by the Secretary of the Navy, Washington, D.C.

[22] Filed: Aug. 9, 1974

[21] Appl. No.: 495,954

[52] U.S. Cl.............. 73/382; 343/5 R; 343/100 ST
[51] Int. Cl............................................. G01v 7/16
[58] Field of Search .......... 73/382; 343/5 CM, 5 R, 343/100 ST

[56] References Cited
UNITED STATES PATENTS 3,555,546   9/1967   Bertram ............................ 343/5 R
3,630,086   12/1971   Wilk ................................. 73/382

Primary Examiner—James J. Gill
Attorney, Agent, or Firm—R. S. Sciascia; J. A. Cooke

[57] ABSTRACT

The subject invention relates to a system useful in measuring the fine scale gravitational field of the earth. The system utilizes two closely-spaced earth orbiting satellites employing radar altimeters, and having the same orbit. As they traverse their orbit the earth is also spinning thereby allowing the satellite pair to "see" a strip of the earth's surface and to accurately measure the cross-orbit component of the deflection of the vertical (the local gravitational force vector). The relative positions of the two satellites must be accurately known, but, to obtain the fine scale measurement, the absolute position of neither satellite need be accurately known.

5 Claims, 4 Drawing Figures 3,888,122

METHOD AND APPARATUS FOR OBTAINING THE FINE SCALE STRUCTURE OF THE EARTH'S GRAVITY FIELD

BACKGROUND AND SUMMARY OF THE INVENTION

Prior methods for obtaining the small-scale structure of the earth's gravitational field are inexact and difficult to perform. These prior methods also do not provide the type and quality of information provided by the present invention, which information enables inter alia the positioning of a fixed site with high precision. As an example of the prior art, U.S. Pat. No. 3,180,151 to Gustaffson discloses airborne apparatus used to measure the earth's gravitational gradient. The Gustaffson apparatus utilizes the well-known gravitometer concept and employs moveable masses and counterbalances. These masses are responsive to the earth's gravity and are arranged so that only the gravitational derivative is measured. Satellite geodesy is not involved nor is a radar altimeter used to measure the sea level contour as is the case in the practice of the present invention.

The present invention provides a method and apparatus capable of measuring, over the surface of the ocean, the slope of the earth's geoid in two orthogonal directions, both components of the deflection of the vertical being measured. In practice of the invention, two substantially identical satellites are placed in the same orbit plane at a predetermined spatial separation. The coincident orbits are nearly circular and have relatively high inclinations, the satellites being approximately one minute apart in time. The satellites each contain a radar altimeter, a two-frequency Doppler transmitter, a three-axis attitude control system, a solid state memory, a propulsion system for making minor modification to the orbit, instrumentation for implementing a line-of-sight satellite-to-satellite tracking loop, and a precision PRN modulated carrier. Since the satellites are spaced in the orbit at a predetermined separation, the earth turns through a known arc between the times that each of the satellites pass through any given point in the orbit. Thus, by differencing the altimeter readings on the two satellites at a given point in inertial space, the across-orbit component of the deflection of the vertical is obtained. The along-track component is obtainable through direct readings. The precise information thus obtained is useful for determining the fine scale structure of the gravitational field of the earth.

Accordingly, it is a primary object of the invention to provide a method and apparatus for determining the fine scale structure of the earth's gravitational field.

It is a further object of the invention to utilize two spatially separated satellites in the same orbit to obtain a precise measurement of the across-orbit component of the deflection of the vertical.

Further objects and advantages of the invention will become apparent in light of the following detailed description of the preferred embodiment of the invention.

DESCRIPTION OF THE PREFERRED EMBODIMENT

Figure 1:
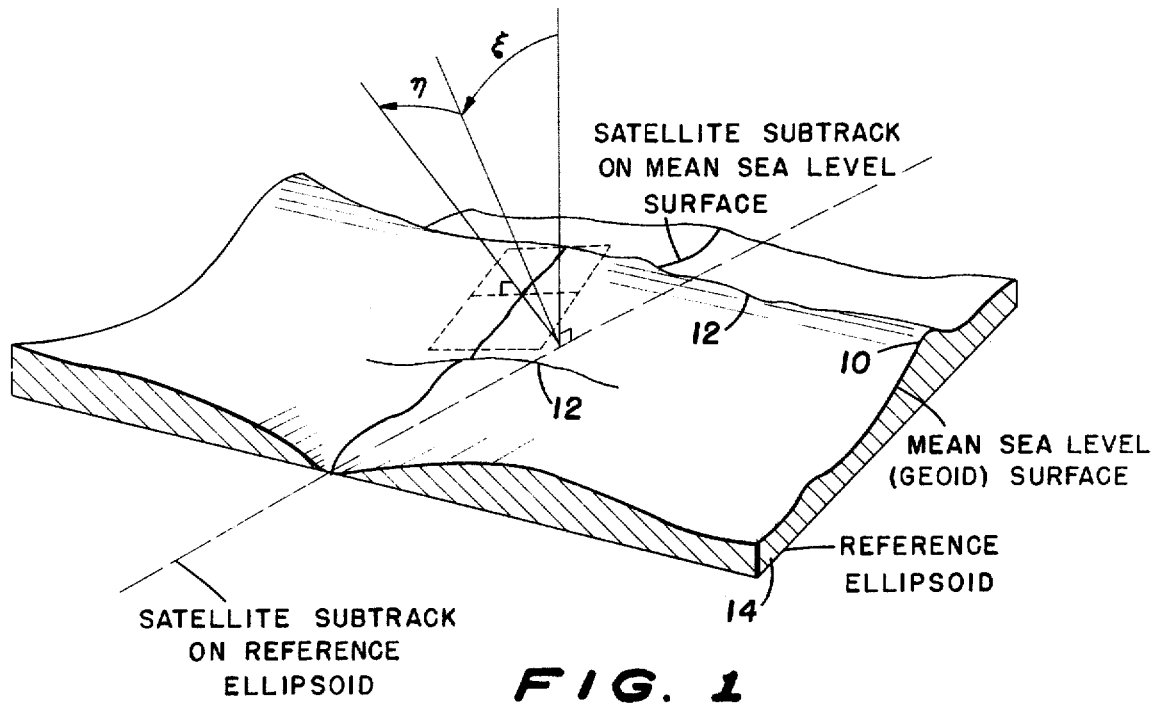
FIG. 1 is a schematic illustrating the nature of the geoid surface of the ocean relative to the ellipsoid surface thereof and the slope of the geoid in two orthogonal directions.

Referring to FIG. 1, it can be seen that the mean sea level shown at 10 is distorted by "undulations" 12 which are a permanent feature of the surface defined as the mean sea level. This mean sea level 10 closely approximates the "geoid," i.e., a surface of constant potential in the combined gravity and centrifugal fields of the earth. Mean sea level deviates from the geoid in areas effected by major ocean currents inter alia but otherwise provides a substantially representative measure of the geoid. The mean sea level 10 can be related to a reference ellipsoid 14 which generally coincides with the geoid on the average. Using the mean sea level 10, or geoid, and the reference ellipsiod 14, the small scale structure of the gravitational field, or what can be referred to as "the deflection of the vertical," can be measured through the use of the present invention.

The deflection of the vertical at any point has two independent components which may be measured in any two independent directions (normal to each other) and which may be related to north-south and east-west coordinates for convenient use. For the purposes of the present invention, the "sub-track" and "cross-track" components of the deflection of the vertical are measured to provide a definition thereof directly from the satellite altimetry apparatus employed in the practice of the invention. The sub-track component is measured along the direction in which the "sub-satellite" point is moving on the surface of the earth, the cross-track component being measured in the direction perpendicular thereto. The sub-track component is determined by measuring the height of one satellite above the geoid at some instant in time and subsequently measuring the height a short time later. In other words, the orbital motion of a single satellite provides the necessary horizontal displacement (over the surface of the geoid) required for determining the sub-track component. Determination of the cross-track component according to the invention requires the use of two satellites as will be described.

According to the present invention, a radar altimeter on each of two spatially separated satellites in the same nearly circular orbit enables the measurement of the fine scale structure (the deflection of the vertical) in the gravitational field over the ocean surface. A radar altimeter is a well-known instrument capable of measuring relatively small (on the order of ten centimeters) height changes in the ocean surface when the orbit of a satellite carrying the altimeter can be precisely determined. The height changes thus measured by such an altimeter have small-scale variations in the gravitational field associated therewith. These variations are sufficiently small as to imperceptibly change the motion of the satellite carrying the altimeter. As a consequence, the measurement thus made is effectively uncoupled from satellite motion perturbations. Thus, direct measurement of the slope of the geoid, i.e., of the mean sea level 10, can be made in one dimension. This one dimension is the geoid height changes that occur along the subtrack of the satellite, i.e., the sub-track slope $\xi$ shown in FIG. 1. "Deflection of the vertical"

can literally be considered to be the direction of the local gravitational force vector measurable over the ocean by measurement of the slope of the local tangent plane.

Figure 2:
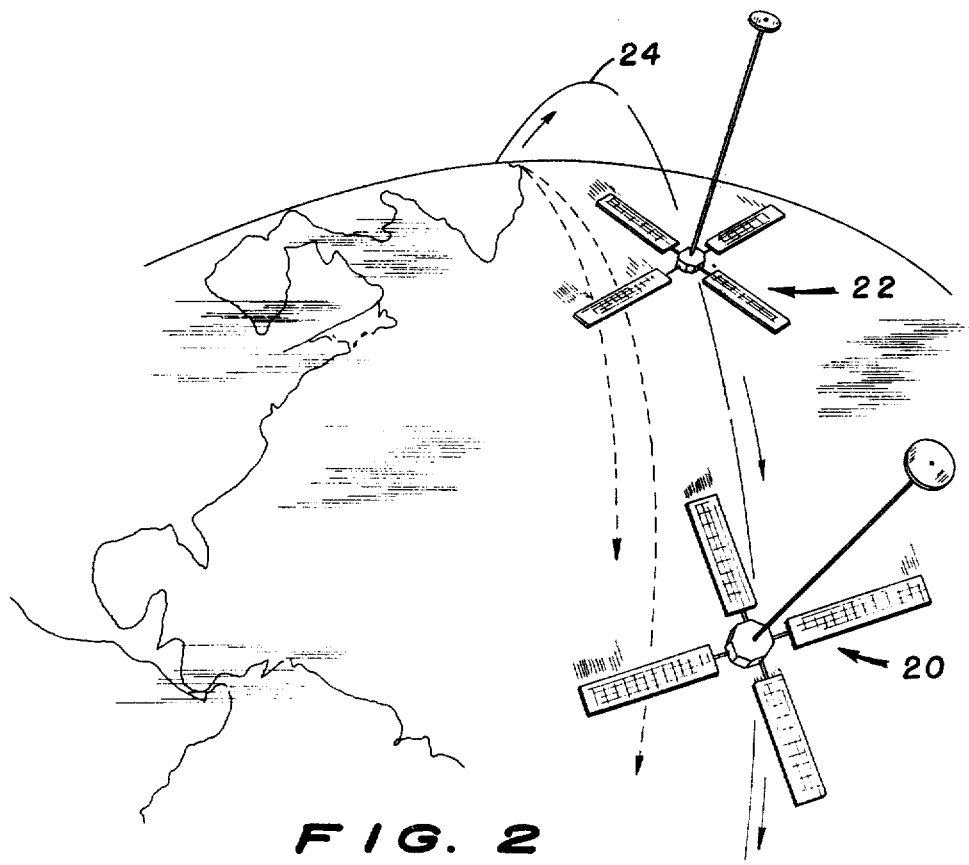
FIG. 2 is an idealized perspective of two spatially separated satellites orbiting in coincident orbits; and, FIG. 3 is a schematic illustrating the relationships between the satellite sub-tracks and cross-tracks.

Although time consuming methods exist to indirectly determine this cross-track slope $\eta$, the present invention provides for essentially simultaneous measurement of both components of the deflection of the vertical, i.e., both the sub-track slope and cross-track slope which essentially constitute the slope of the geoid in two orthogonal directions. The invention can be seen in FIG. 2 to consist of two substantially identical satellites 20 and 22 which carry radar altimeters and which are placed in coincident orbits represented by 24 at a predetermined spatial separation. The orbit 24 of the satellites is preferably nearly circular at an altitude between 750–1500 kilometers and at an inclination of from 70°–110°, the spacing of the satellites in the orbit plane being preferably on the order of 1 minute in time or about 500 kilometers apart. During the minute which elapses between the passing of the satellites 20 and 22 through any given point in the orbit 24, the earth rotates approximately one-fourth of a degree (about 30 kilometers at the equator). Thus by differencing radar altimeter readings from each of the satellites when the satellites successively occupy the same position in inertial space, the cross-track slope $\eta$ of the deflection of the vertical is obtained. The sub-track slope $\xi$ is directly obtainable from the radar altimeter aboard either of the satellites 20 or 22. Since height differences only are of interest in the present measurement, neither satellite 20 or 22 need be tracked with precision. Since the satellite-to-satellite link in the present situation produces no propagation anomalies and since propagation errors essentially cancel out due to the fact that the satellites are simultaneously above the horizon of any ground station, the difference in orbit is readily obtained in a known fashion. The scale at which the deflection of the vertical, i.e., the fine scale structure of the gravitational field, is measured can be changed by altering the spacing between the satellites 20 and 22.

Figure 3:
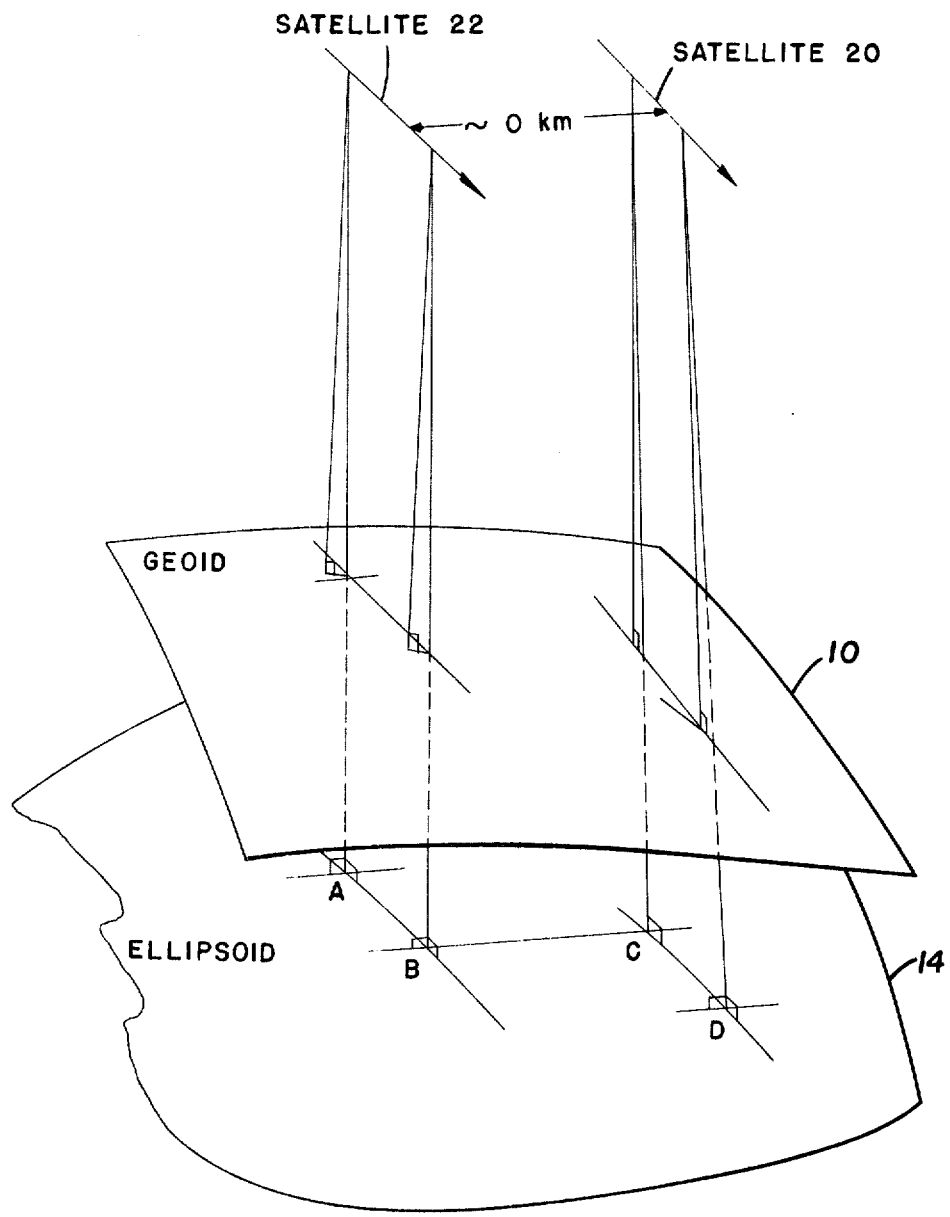

The invention can be described also relative to FIG. 3 wherein the satellites 20 and 22 are to be understood to be in identical co-planar orbits. The orbits are shown as separated for convenience of illustration only. As the satellite 20 moves around the earth, its sub-satellite point traces out the line CD on the surface of the reference ellipsoid 14 that approximates the earth. By the time that the satellite 22 reaches the point in space where it should be above the point C, the earth has rotated a finite amount. Thus, the sub-satellite track of the satellite 22 is displaced westwardly from CD to AB. The line BC is a cross-track line for both of the satellites 20 and 22.

The sub-track component of the deflection of the vertical is geometrically measured at the center of the line CD by comparing the altimeter readings of either of the satellites 20 or 22 at points C and D. Alternatively, the sub-track component could be measured (as with CD above, in the sense of an "average" value) at the center of the line AB by comparing the altimeter readings of either of the satellites 20 and 22 at the points A and B. Thus, the sub-track component of the deflection of the vertical can be measured with the use of only one of the satellites and can essentially be taken from the mathematical average of the heights of two points along the orbital sub-track. However, determination of the cross-track component must be made midway between B and C by comparing the height of the satellite 20 at C and the height of the satellite 22 at B (the "heights" being the measured altitude of the satellite above the geoid 10).

Use of the two satellites 20 and 22 as previously described is thus seen to yield both components of the deflection of the vertical for any part of the ocean that the satellites pass over. Since height differences rather than the absolute value of the heights are primarily of interest, the altitude of neither satellite need be determined with great precision. Only the change in altitude of either satellite 20 or 22 in a time interval on the order of a second, and the difference in the altitudes of the satellites 20 and 22 as they pass through the same point in inertial space (this point being over points B and C on the earth at the time of the respective passes of the satellites through said point) is required to yield the desired components.

The deflection of the vertical can also be defined as the angle between the normal to the reference ellipsoid 14 and the normal to the geoid 10 (or plumb-bob vertical) at the point of intersection on the geoid. An equivalent definition is "the rate of change of geoidal height with respect to a change in arc distance along the reference surface." Expressed mathematically, $$\delta = \frac{dH_g}{ds} = \text{the deflection of the vertical} \quad (1)$$

This angle $\delta$ can be specified by a north-south component, $\xi$, and an east-west component $\nu$, where $$\xi = -\frac{1}{r_e} \frac{\partial H_g}{\partial \phi_e}$$

$$\nu = -\frac{1}{r_e \cos \phi_e} \frac{\partial H_g}{\partial \lambda_e} \quad (2)$$

Altimeter data from a single satellite can be used to measure the component of the deflection of the vertical along its orbital sub-track. If we define $\alpha$ to be the azimuth (measured clockwise from north) of the sub-track direction over which the deflection of the vertical is determined, then this deflection angle, $\delta$, can be related to $\xi$ and $\nu$ by the following formula:

$$\delta = \xi \cos(\alpha + \pi) \quad (3)$$

where $$\alpha = \tan^{-1} \frac{\cos \phi_e \sin \Delta \lambda_e}{\sin \phi_e \cos \phi_{e_0} - \cos \phi_e \sin \phi_{e_0} \cos \Delta \lambda_e}$$

$$\phi_e = \phi_{e_0} + \Delta \phi_e$$
$$\lambda_e = \lambda_{e_0} + \Delta \lambda_e \quad (4)$$

$\Delta \phi_e$ and $\Delta \lambda_e$ denote the change in the angles in the direction of the slope determination. It is therefore obvious from equation (3) and from the previous discussion that two measurements of the deflection of the vertical are required in a given area in order to obtain both components of the total deflection angle. Also the path directions over which both angles are measured must be sufficiently distinct to insure that any desired transformation to the north-south and east-west components is well defined.

To measure the deflection of the vertical it is proposed as described generally hereinabove to launch two satellite-borne altimeters in very nearly the same orbital plane separated by a finite in-plane distance. The satellites 20 and 22 would preferably be at an altitude of roughly 1,000 km with an orbital inclination of 70°. In this configuration, the subtracks have a maximum east-west separation of 14 km, each altimeter on the satellites 20 and 22 having a data rate of one measurement per second while over the broad ocean areas. An eccentricity less than 0.005 is required to insure that satellite altitude changes over the 1 second measurement intervals do not affect the precision of the altimeters. The altitude is chosen so that the satellite orbit is insensitive to the high frequency variations of the earth's gravity without placing a severe power requirement on the altimeters. The effects of atmospheric drag are not a problem at this altitude.

The relative doppler shift between the satellites 20 and 22 as measured by satellite 20 can be written $$\Delta f_1 = (f_1 - f_2) - \frac{f_2}{c} \dot{\rho} \quad (5)$$

where
$f_1, f_2$ = frequencies generated by satellites 20 and 22 respectively;
$c$ = speed of light; and,
$\dot{\rho}$ = range rate between satellites at any given time The frequency offset, $(f_1 - f_2)$ is needed to insure that the doppler shift does not change sign. Similarly, the doppler shift measured at the satellite 20 is given by $$\Delta f_2 = (f_2 - f_1) - \frac{f_1}{c} \dot{\rho} \quad (6)$$

$$\overline{\Delta f} = \frac{1}{2} (\Delta f_1 + \Delta f_2) = - \frac{(f_1 + f_2)}{2c} \dot{\rho} \quad (7)$$

This eliminates, to first order, errors resulting from relative oscillator drifts of the two satellites. Integrating (7) yields the cycle count, $$N(t_1, T) = \int_{t_1}^{t_1+T} \overline{\Delta f} \, dt = - \frac{(f_1 + f_2)}{c} \, \Delta(t_1) \, t_1 \quad$$

which gives the change in range between the two satellites over the time interval, $T$.

Any secular changes in $\rho$ must result from differences in the sub-track (or "along-track") distance traveled by each satellite in the given time interval. This distance is given by:

$$D_L \int_{t_1}^{t_1+T} r_s \dot{\beta} \, dt \quad (9)$$

where
$\beta$ = argument of latitude of the satellite.
It can be shown that the major secular effect in (9) goes as
$$\overline{a_s} \, n_s \Delta t$$

where $\overline{a_s}$ is the mean value of the semi-major axis of the orbit, and $n_s$, the mean motion. Thus, from the secular changes in range between the two satellites, a very accurate measure of the differences in the mean semi-major axes of the two orbits can be obtained.

Similarly, with sufficient accuracy, the difference between altimeter measurements of the two satellites can be written as $$h_1 - h_2 = (r_{s_1} - r_{s_2}) - (r_{g_1} - r_{g_2}) \quad (10)$$

where:
$h_1, h_2$ = altitudes of satellites 20 and 22 respectively;
$r_{s_1}, r_{s_2}$ = inertial radii of satellites 20 and 22 respectively; and
$r_{g_1}, r_{g_2}$ = geocentric radii of points taken relative to satellites 20 and 22 respectively.

The second difference in equation (10) contains only periodic terms. Therefore, averaging the differential altimeter measurements over a sufficiently long time interval should also give an accurate measure of the difference in the mean semi-major axes of the two satellites 20 and 22. Thus, the satellite-to-satellite data can be used to calibrate the two radar altimeters relative to each other.

The deflection angles for each area of a desired grid size are computed by dividing each ocean area into grid sizes (~10–15 km on a side) and combining measurements taken in each area to obtain a first estimate of the $\xi$ and $\nu$ components of the deflection of the vertical. For the common side of two adjacent areas, the two measured components in that direction would be combined into a single averaged value. Finally the closure property is used as a constraint in at least squares adjustment of all the measured slopes. The closure property states that the change in value of a continuous function around any closed loop must sum to zero. The use of this closure property minimizes the errors in the measurements.

An alternate method of determining the deflection angles is to first do polynomial curve fitting to the measurements over larger areas; then use the closure property as a final adjustment of all the parameters.

Figure 4:
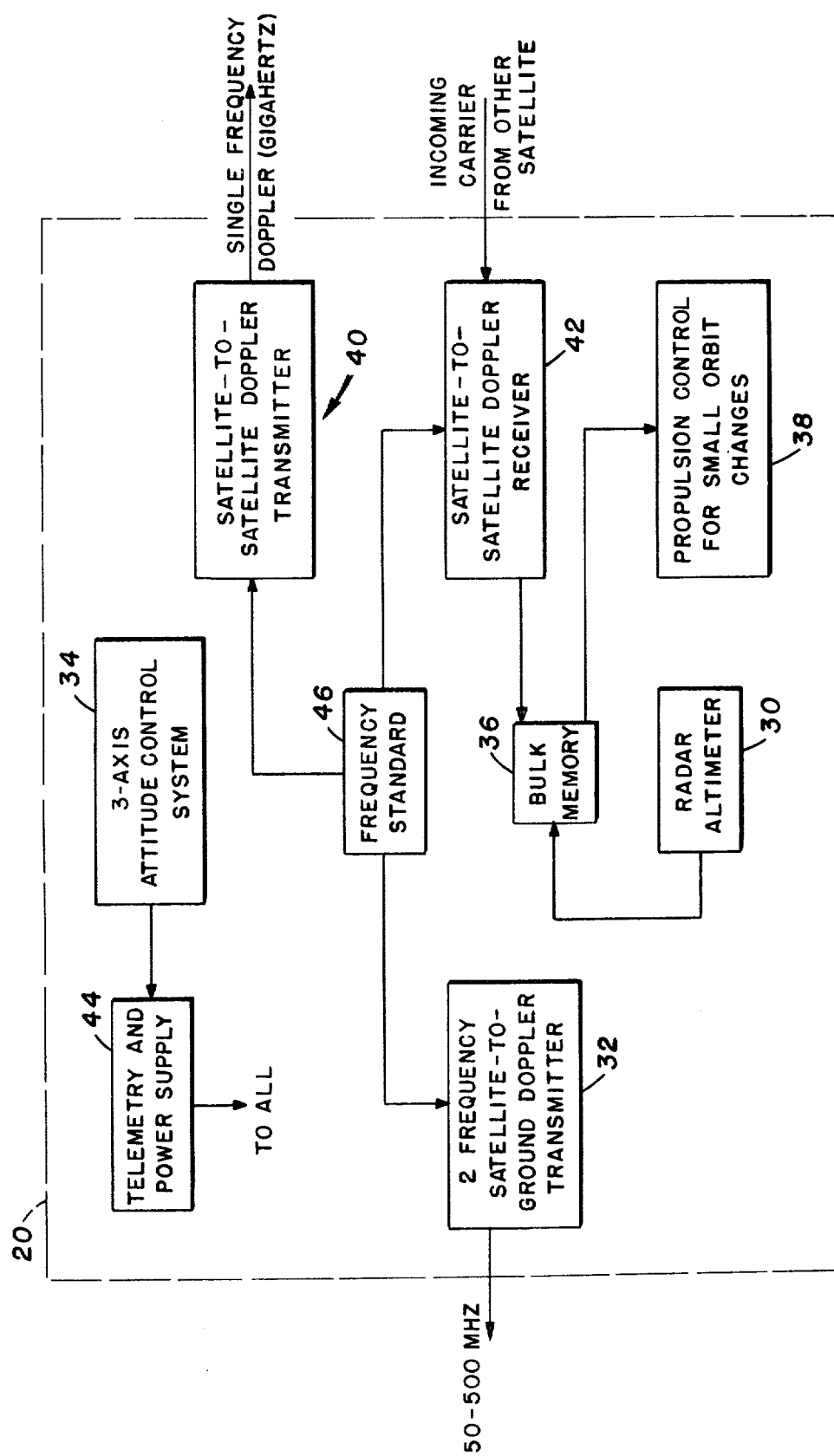
FIG. 4 is a schematic illustrating the components of the satellites shown in FIG. 2.

Referring now to FIG. 4, the satellite 20 is shown schematically to comprise a radar altimeter 30; a two-frequency Doppler transmitter 32; a three-axis attitude control system 34; a solid state memory 36, a propulsion system 38 for modifying the orbit of the satellite; and, instrumentation 40 for implementing a line-of-sight satellite-to-satellite tracking loop including a precision PRN modulated carrier (not shown). These subsystems are powered by the power supply unit 44 which also contains telemetry instrumentation. Since the satellites 20 and 22 are substantially identical, the satellite 22 takes the same design as that shown for the satellite 20. The two satellites 20 and 22 differ primarily in the different frequencies assigned to each. The satellite components thus described are well-known, the combination thereof according to the method taught by the present invention producing the advance in the art disclosed herein.

The two satellites 20 and 22 operate to allow measurement of the relative range (or Doppler shift) therebetween, each satellite making such measurement utilizing the transmitter 32 on the other satellite and its own receiver 42 referenced to frequency standard 46. The link between the satellites 20 and 22 is preferably a high frequency (~3.0 gigahertz) link. The altimeters 30 on each of the satellites 20 and 22 illuminate a patch of the ocean surface which is several (~10) kilometers square, thereby the height above mean sea level 10 is measured. The Doppler tracking data on each of the satellites 20 and 22 obtained by ground tracking stations is used to determine the orbit of each of the satellites relative to the other, i.e., "the difference orbit," and to determine the position of either satellite so that a geographic position can be assigned to the deflection of the vertical measured by the invention.

Each of the satellites 20 and 22 records at periodic intervals (~1 second) the altimeter reading from the altimeters 30 and the relative Doppler shift between it and the other satellite. At every opportunity, a ground based tracking site (not shown) records the Doppler shift from the four (two in each satellite) Doppler transmitters 32. A ground station at high latitude recovers the altimeter and relative-Doppler data on each revolution about the earth.

The values for the sub-track slope $\xi$ can then be determined by:

$$\xi = \frac{h(t+\Delta t) - h_R(t+\Delta t) - [h(t) - h_R(t)]}{D}$$

and the cross-track slope $\eta$ by:

$$\eta = \frac{h_b(t+\Delta t) - h_{bR}(t+\Delta t) - [h_a(t) - h_{aR}(t)]}{C}$$

where
$D, C$ = the sub-track and cross-track arc lengths traveled by the satellites 20 and 22 in the time $\Delta t$, as measured on the geoid;
$a, b$ = the satellites 20 and 22 respectively;
$h_R$ = the height measured to the ellipsoidal reference surface;
$h$ = the height measured by the altimeter; and,
$\Delta t$ = the time required for the rear satellite to traverse the inter-satellite distance.

What is claimed is:

1. A method for determining the direction of the sub-track and cross-track components of the local gravitational force vector over the surface of an ocean, comprising the steps of:
    orbiting at least two satellites in predetermined coincidental orbits, the satellites being spatially separated in the orbital plane by a predetermined temporal interval;
    measuring the height of each satellite above mean sea level as each of the satellites pass through a given point in inertial space;
    determining the difference in height above mean sea level measured by the two satellites during the respective passes through the given point;
    mathematically processing the difference in height thus measured to yield the cross-track component;
    measuring the height of either one of the two satellites at two closely spaced points in inertial space; and
    mathematically processing the two heights thus measured to yield the sub-track component.

2. The method of claim 1 wherein the difference in height above mean sea level as measured by the two satellites is given by:

$$h_1 - h_2 = (rs_1 - rs_2) - (rg_1 - rg_2)$$

where:
$h_1, h_2$ = the respective altitudes of the two satellites;
$rs_1, rs_2$ = the respective inertial radii of the two satellites; and,
$rg_1, rg_2$ = the respective geocentric radii of points taken relative to the two satellites.

3. The method of claim 1 wherein the step of processing the measured difference in height to determine the sub-track component is accomplished by solution of the following expression wherein $\xi$ represents the value for the sub-track slope:

$$\xi = \frac{h(t+\Delta t) - h_R(t+\Delta t) - [h(t) - h_R(t)]}{D}$$

where:
$D$ = the sub-track arc length traveled by the satellites in the time $\Delta t$ as measured on the geoid;
$h_R$ = the height measured to the ellipsoidal reference surface;
$h$ = the height measured by the altimeter; and
$\Delta t$ = the time required for the rear satellite to traverse the inter-satellite distance.

4. The method of claim 3 wherein the step of processing the two heights to determine the cross-track component is accomplished by solution of the following expression wherein $\eta$ represents the value for the cross-track slope:

$$\eta = \frac{h_b(t+\Delta t) - h_{bR}(t+\Delta t) - [h_a(t) - h_{aR}(t)]}{C}$$

where:
$C$ = the cross-track arc length traveled by the satellites in the time $\Delta t$ as measured on the geoid;
$a, b$ = the two satellites;
$h_{a_R}, h_{b_R}$ = the height measured to the ellipsoidal reference surface from the satellites $a$ and $b$ respectively;
$h_a, h_b$ = the height measured by the altimeter aboard satellites $a$ and $b$ respectively; and,
$\Delta t$ = the time required for the rear satellite to traverse the inter-satellite distance.

5. Apparatus for determining the direction of the sub-track and cross-track components of the gravitational force vector over the surface of an ocean, comprising:
    at least two satellites positioned in predetermined coincidental orbits around the earth, the satellites being spatially separated in the orbital plane by a predetermined temporal interval;
    means on each of the satellites for measuring the height thereof above mean sea level as each satellite passes through a given point in inertial space;
    means for determining the difference in height above mean sea level measured by the two satellites during the respective passes thereof through the given point;
    means for processing the difference in height thus measured to yield the cross-track component;
    means for measuring the height of either one of the two satellites at two closely spaced points in inertial space; and,
    means for processing the two heights thus measured to yield the sub-track component.

* * * * *